US010839263B2

(12) United States Patent
Thompson et al.

(10) Patent No.: US 10,839,263 B2
(45) Date of Patent: Nov. 17, 2020

(54) SYSTEM AND METHOD FOR EVALUATING A TRAINED VEHICLE DATA SET FAMILIARITY OF A DRIVER ASSITANCE SYSTEM

(71) Applicant: Harman International Industries, Incorporated, Stamford, CT (US)

(72) Inventors: Aaron Thompson, Brighton, MI (US); Honghao Tan, Brighton, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 103 days.

(21) Appl. No.: 16/156,366

(22) Filed: Oct. 10, 2018

(65) Prior Publication Data
US 2020/0117950 A1 Apr. 16, 2020

(51) Int. Cl.
*G06K 9/00* (2006.01)
*G06K 9/62* (2006.01)
*G06T 7/70* (2017.01)
*G06N 20/00* (2019.01)

(52) U.S. Cl.
CPC ....... *G06K 9/6256* (2013.01); *G06K 9/00791* (2013.01); *G06N 20/00* (2019.01); *G06T 7/70* (2017.01)

(58) Field of Classification Search
CPC .. G06K 9/6256; G06K 9/00791; G06N 20/00; G06T 7/70
See application file for complete search history.

(56) References Cited

U.S. PATENT DOCUMENTS

| 2005/0021201 | A1  | 1/2005  | Klotz et al. |
| 2014/0149806 | A1* | 5/2014  | Khalastchi ......... G06K 9/00496 714/49 |
| 2018/0354510 | A1* | 12/2018 | Miyata .................. B60W 50/14 |
| 2019/0050718 | A1  | 2/2019  | Tickoo et al. |
| 2019/0294881 | A1* | 9/2019  | Polak ................... G06K 9/4628 |
| 2019/0333232 | A1* | 10/2019 | Vallespi-Gonzalez ...................... G06N 5/003 |

FOREIGN PATENT DOCUMENTS

| DE | 102008013366 A1 | 9/2009 |
| DE | 102009050503 A1 | 11/2010 |

* cited by examiner

*Primary Examiner* — Xin Jia
(74) *Attorney, Agent, or Firm* — McCoy Russell LLP

(57) ABSTRACT

The present disclosure relates to systems, devices and methods for evaluating a trained vehicle data set of a driver assistance system. Embodiments are directed to scoring run time attributes of a scene detection operation using a trained vehicle data set against a vector representation for an annotated data set to assess the ability of the scene detection operation to perceive target object attributes of the vehicle sensor data. In one embodiment, scoring evaluates effectiveness of the scene detection operation in identifying target object attributes of the vehicle sensor data using the trained vehicle data set. An event flag may be determined for a trained vehicle data set based on the scoring, the even flag identifying one or more parameters for updating the trained vehicle data set. Configurations and processes can identify anomalies to a trained vehicle data set and allow for capturing useful real world data to test runtime operations.

20 Claims, 5 Drawing Sheets

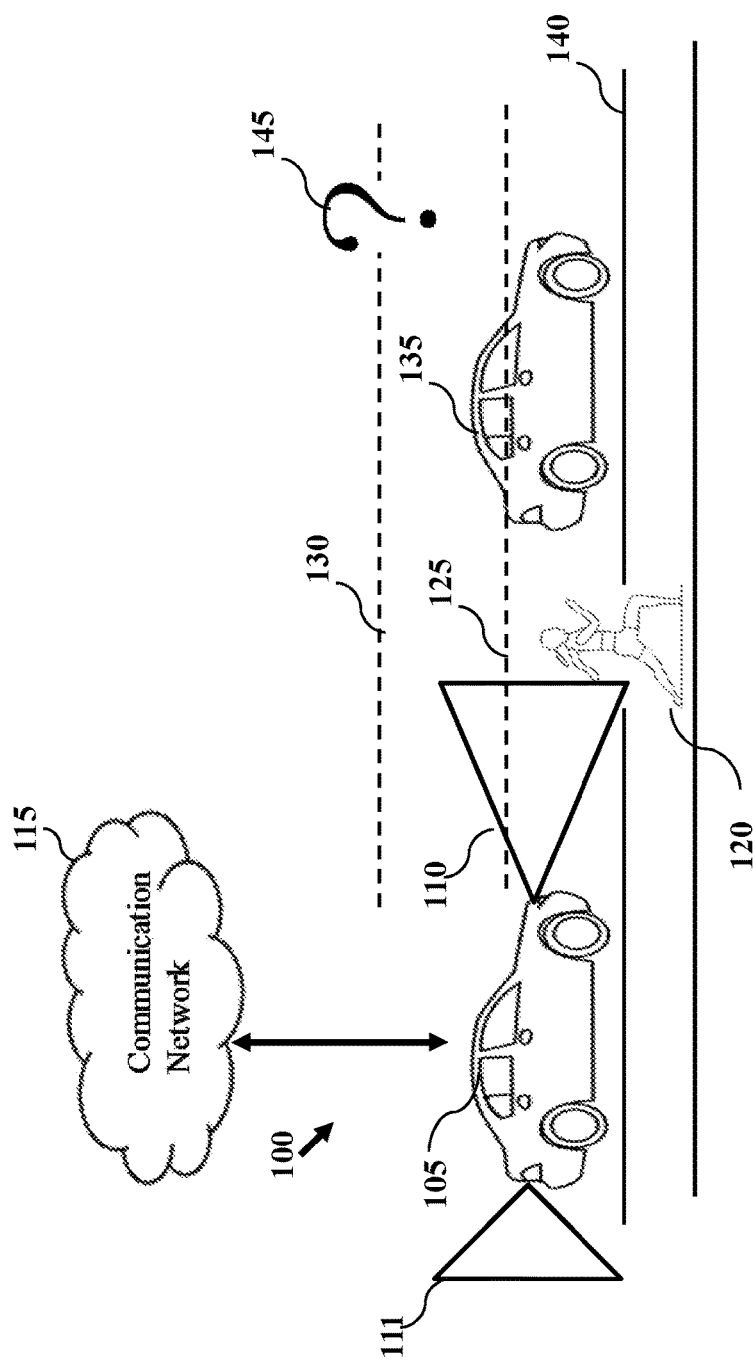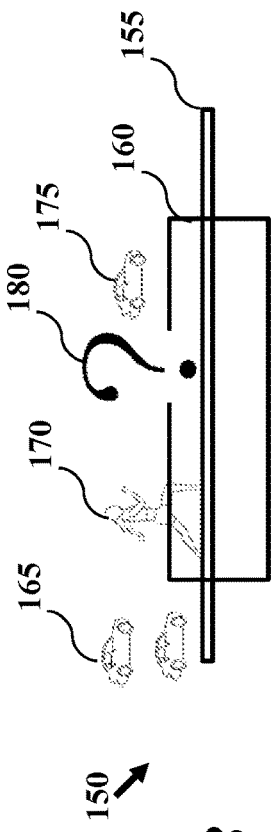
FIG. 1A
FIG. 1B

SYSTEM AND METHOD FOR EVALUATING A TRAINED VEHICLE DATA SET FAMILIARITY OF A DRIVER ASSITANCE SYSTEM

CROSS-REFERENCE TO RELATED APPLICATIONS

This application is concurrently filed with U.S. application Ser. No. 16/156,357, entitled SYSTEM AND METHOD FOR DETERMINING VEHICLE DATA SET FAMILIARITY filed on Oct. 10, 2018, the disclosure of which is hereby expressly incorporated by reference.

FIELD

The present disclosure relates to systems, methods and devices for assistive and autonomous driving and more particularly to evaluating a trained data set.

BACKGROUND

Vehicle systems are being developed to provide assistance with operation of a vehicle. The systems can include providing feedback and vehicle control. There exists a need for systems and processes to accurately identify data that is important to vehicle detection systems. Many of the existing systems collect large amounts of data which is hard utilize. By way of example, a vehicle system including multiple sensors may generate a vast amount of data during operation. Because existing systems typically generate and store data indiscriminately there is a significant cost associated storage and maintaining data. In addition to processing, these systems require large scale data storage capabilities. Drawbacks of these systems can include not being able to handle data efficiently, cost for storing data, and difficulty in identifying data of relevance. Existing systems do not provide configurations to interpret significant data. As a result, existing systems may be hampered by data that is stored and not useful. There exists need to improve configurations of vehicle systems for assisted driving and to evaluate trained data for assistive driving systems.

BRIEF SUMMARY OF THE EMBODIMENTS

Disclosed and claimed herein are methods, devices and systems for driver assistance systems. One embodiment is directed to a method for evaluating a trained vehicle data set of driver assistance system. The method includes receiving, by a control unit, vehicle sensor data captured by at least one sensor of the vehicle, the vehicle sensor data generated by a driver assistance system of a vehicle. The method also includes running, by the control unit, a scene detection operation on the vehicle sensor data using a trained vehicle data set to identify target object attributes of the vehicle sensor data. The method also includes scoring, by the control unit, run time attributes of the scene detection operation against a vector representation for an annotated data set to assess the ability of the scene detection operation to perceive target object attributes of the vehicle sensor data using the trained vehicle data set, wherein scoring evaluates effectiveness of the scene detection operation in identifying target object attributes of the vehicle sensor data. The method also includes determining, by a control unit, an event flag for the trained vehicle data set based on the scoring, whether the event flag identifies at least one of a parameter and data sample for updating the trained vehicle data set.

In one embodiment, the vehicle sensor data includes at least one of image, radar, and LiDAR data for a detection zone of the driver assistance system of the vehicle.

In one embodiment, running the scene detection operation on the vehicle sensor data identifies target objects in real time based on the attributes of the trained vehicle data set, the trained vehicle data set providing a plurality of object types and object attributes.

In one embodiment, vehicle trained data set includes object types and object attributes for a known annotated data set.

In one embodiment, vector representation for the annotated data set provides a spatial representation for a plurality of objects and object attributes of ground truth objects and wherein the vector representation for the annotated data set is used as a reference for comparing vehicle sensor data.

In one embodiment, scoring run time attributes of the scene detection operation includes determining a value to represent object types and object attributes not included and underrepresented in the vehicle trained data set.

In one embodiment, scoring run time attributes of the scene detection operation includes determining a measure of a known data set relative to instantaneous vehicle data during in a runtime environment, the scoring to include comparing handled events and anomalies detected.

In one embodiment, effectiveness of the scene detection operation is determined based on a probability that the trained vehicle data set can handle target objects of the vehicle sensor data.

In one embodiment, the event flag is generated to identify a data range of the vehicle sensor data and target object.

In one embodiment, the event flag represents a vehicle operation condition that is identified to have a strong correlation with anomalies of the trained vehicle data set.

Another embodiment is directed to a vehicle control unit including an input configured to receive vehicle sensor data, and a control unit coupled to the input. The control unit is configured to receive vehicle sensor data captured by at least one sensor of the vehicle, the vehicle sensor data generated by a driver assistance system of a vehicle. The control unit is also configured to run a scene detection operation on the vehicle sensor data using a trained vehicle data set to identify target object attributes of the vehicle sensor data. The control unit is also configured to score run time attributes of the scene detection operation against a vector representation for an annotated data set to assess the ability of the scene detection operation to perceive target object attributes of the vehicle sensor data using the trained vehicle data set. Scoring evaluates effectiveness of the scene detection operation in identifying target object attributes of the vehicle sensor data. The control unit is also configured to determine an event flag for the trained vehicle data set based on the scoring, whether the event flag identifies at least one of a parameter and data sample for updating the trained vehicle data set.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIGS. 1A-1B depict graphical representations of scenario data according to one or more embodiments;

DETAILED DESCRIPTION OF THE EXEMPLARY EMBODIMENTS

Overview and Terminology

Figure 3:
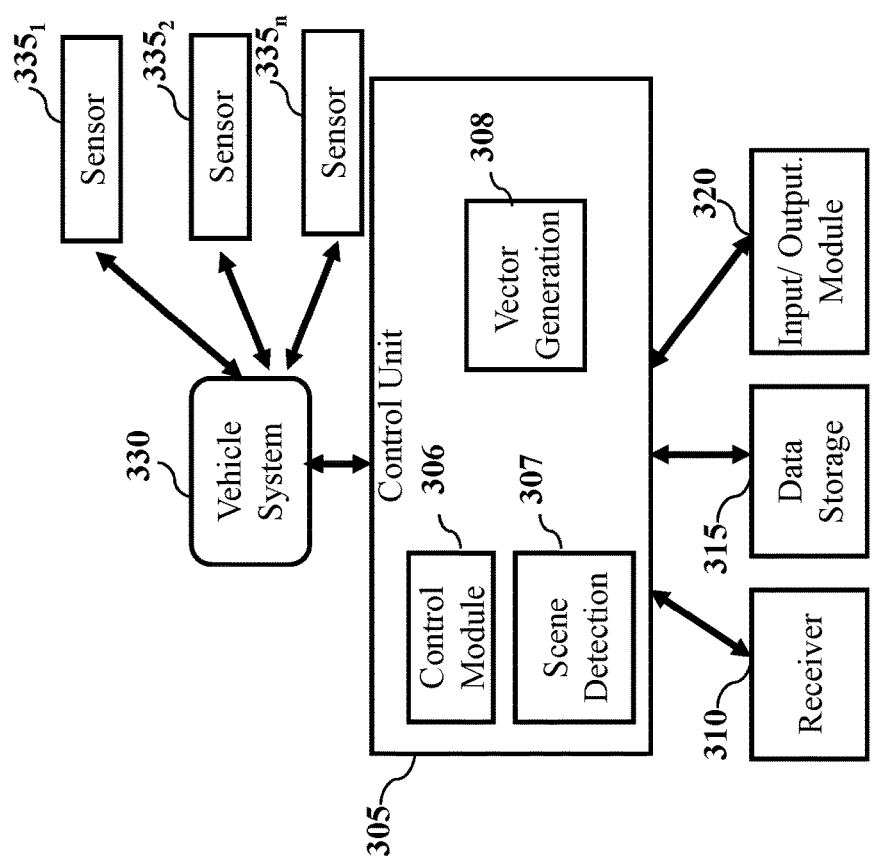
FIG. 3 depicts a graphical representation of a vehicle control unit according to one or more embodiments.

One aspect of the disclosure is directed to vehicle assistance systems, such as assistive or autonomous driving systems, configured to evaluate a trained vehicle data set and operations of the vehicle assistance systems. In one embodiment, data detected by a vehicle system may be compared to a vector generated for a data set used by the vehicle to detect objects, such as a trained vehicle data set. One or more operations are described to determine whether the runtime operations of the vehicle and/or the vehicle trained data set are familiar with objects in the vehicle sensor data.

Configurations and operations that allow for determining familiarity for sensed data and scenarios may be based on a known annotated data set, given an unknown ideal state of data and a vehicle configuration having a probe system of one or more sensors that can interpret a driving scene. Operations described herein can perform calculations (e.g., estimations) of the known annotated data set in the embodiment of a vector. The vector may be used to compare an instantaneously analyzed scene to known annotated data set in real-time. In one embodiment, the comparison is utilized to determine whether a run time algorithm that is trained on the annotated data set is familiar with the instantaneous analysis of the scene.

Determining familiarity may allow for flagging data and events detected by vehicle sensors. As a result, these functions solve problems and burdens associated with capturing large amounts of vehicle sensor data. Embodiments are directed to identifying and capturing only significant or "useful" real-world data in event flags that can be used to better train and test a runtime perception algorithm. By way of example, in the case of a single camera system that is analyzing lanes, large amounts of data may have been captured of the same nature or scenario. Embodiments allow for automatically identifying corner cases or anomalies to the original training set of data. Embodiments are also directed to determining how the training set handles anomalies or scenarios that may not be trained. As a result, configurations allow for providing an automated method to identify a scene that is not familiar or is an anomaly to a known training data set.

In one embodiment, run time attributes of a scene detection operation may be scored against a vector representation for an annotated data set. Scoring of the run time attributes can assess the ability of the scene detection operation to perceive target object attributes of the vehicle sensor data using the trained vehicle data set. Scoring can evaluate effectiveness of the scene detection operation in identifying target object attributes of the vehicle sensor data. In other embodiments, scoring can evaluate the effectiveness of a trained vehicle data set, or annotated baseline data.

Systems, configurations and processes are provided to identify familiarity of trained data relative to sensed data. In one embodiment, an event flag may be output for the trained vehicle data set based on the scoring to identify one or more parameters for updating the trained vehicle data set. Embodiments are also directed to detection and characterization of anomalies in vehicle data sets. Parameters may include an object type, object attribute, target objects (e.g., other vehicles, lane markers, barriers, etc.), driving conditions (e.g., a braking condition, vehicle sliding, distance to other vehicles/objects, etc.) and/or scenario. Sample data may relate to vehicle sensor data associated with a parameter. As used herein, one or more anomalies may be determined with respect to vehicle sensor data using a trained vehicle data set. In some instances, the trained vehicle data set is not able to identify or classify a detected object. In other embodiments, vehicle sensor data may conflict with respect to a detected object.

As used herein, assistive driving may refer to at least one of providing an indication, capturing data, controlling operation of a vehicle, activating a vehicle system and vehicle control operations in general for driver and/or driverless controlled vehicles. as Assistive driving may relate to one or more functions of an advanced driver assistance system (ADAS) or autonomous driving (AD) system. Assistive driving operations may include lane change assist, parking assist, braking control, etc. Assistive driving may also refer to systems and operations for autonomous driving systems and vehicles. An assistive driving system can relate to a vehicle system including at least one sensor to detect objects or vehicle operating conditions, a control unit and one or more vehicle systems to control the vehicle. Object and vehicle data may be determined from at least one sensor, including but not limited to an image sensor (e.g., video), radar sensor, LiDAR sensor, acceleration/motion sensor and vehicle sensors (e.g., wheel speed sensor, tire pressure monitoring system (TPMS) sensor, ABS sensor, yaw/pitch sensor, stability control sensor, etc.). According to one embodiment, assistive driving systems may operate using baseline data, such as a trained data set to detect target objects (e.g., other vehicles, lane markers, barriers, etc.), driving conditions (e.g., a braking condition, vehicle sliding, distance to other vehicles/objects, etc.) and/or scenarios. The baseline data may include one or more recognized object types and object attributes. The baseline data can also include scenario data for objects and object arrangement. For example, patterns of lane markers may be detected to signal a lane merger or bend in a road. As will be discussed herein, objects, object attributes, and scene data may be part of a scenario which may be identified and characterized. Systems, methods and configurations described herein, can include vehicle systems for real-world deployment in various conditions or scenes (e.g., day, night, low-light, weather related, etc.). In addition, systems and methods may be performed during run time (e.g., while the program is being executed) for in-vehicle use.

According to another aspect of the disclosure, embodiments directed evaluation of a trained vehicle data set and operations of the vehicle assistance systems are based on event capture and operations for analyzing vehicle sensor data. Data of significance may be used to determine capture events and data segments, annotation of a base line data set, and determining whether scene data detected overall is valid.

In one embodiment, processes include generating a vector representation of trained data set or annotated baseline data. In other embodiments, processes include generating a vector representation of vehicle sensor data. Vector representations may be based on model data of the system and may be used to determine effectiveness of the system in identifying objects using a trained data set and/or effectiveness of the trained data set. Generating a vector representation may include performing one or more operations by a vehicle controller. In one embodiment, vector representation allows for an anomaly vector to be determined. The anomaly vector may be used to identify objects or scenarios that are of significance to the system.

According to one embodiment vector representations may be employed for determining a significant scenario based on vector representations of object type, object attributes, object patterns, and scenes. By way of example, vector representations of the object type may identify an object that does not match or cannot be identified with parameters of the data set for identifying an object. In one embodiment, object attributes may be significant, where a target object is detected and is classified as an object. The target object may include one or more attributes that are identified and not adequately handled by a control device, accordingly the one or more attributes may be significant. In another embodiment, vector representations of object patterns, such as lane markers, parking situation patterns, braking patterns for stop and go traffic, etc., may be handled by a vector representation for the pattern. Situations which differ from patterns of the data set, or driving situations including a pattern and then a divergence from the pattern may be identified as significant. Vector representations may be generated for a scene based on one or more parameters. For a driving scene that is relative to other objects, such as other vehicles, movement of the other vehicles and the vehicle including a control unit may be detected to identify significant scenarios for the vehicle including a control unit, such as a traffic pattern the vehicle is not properly trained to handle. Alternatively, scenarios may relate to driving conditions based on weather (e.g., rain, snow, fog, etc.), road condition (e.g., paved, unpaved, low traction, etc.), lighting conditions (e.g., low light, and operating scenarios for a vehicle.

According to one embodiment, a control unit of a vehicle is configured to evaluate a trained vehicle data set of driver assistance system using a vector generated for trained vehicle data. Processes and device configurations are provided to identify scenario data detected from one or more vehicle sensors. The vehicle sensor data may be detected during runtime and used to evaluate the algorithms for detecting the sensor data. In certain embodiments, vehicle training data and the ability of a vehicle system to detect objects and driving configurations may be evaluated. In one embodiment, a vehicle control unit includes at least one input configured to receive vehicle sensor data. The control unit may also include an input to receive a vector for trained vehicle data. The control unit may be part of a vehicle control system, such as an assistive driving unit or autonomous driving module. The control unit may be configured to score run time attributes of the scene detection operation against a vector representation for an annotated data set to assess the ability of the scene detection operation to perceive target object attributes of the vehicle sensor data using the trained vehicle data set. As will be discussed in more detail below, scoring evaluates effectiveness of the scene detection operation in identifying target object attributes of the vehicle sensor data. The control unit may determine event flags for the trained vehicle data set based on the scoring to identify one or more parameters for updating the trained vehicle data set.

Processes and device configurations described herein can flag events or scenarios where a trained vehicle data set is insufficient. Reporting event flags allows for providing only the necessary data, such as a subset of sensor data generated by a vehicle for a period of time. By providing data for a particular period of time, an entire data set of the vehicle does not have to be analyzed to determine data of interest. The processes and device configurations described herein allow for a vehicle control unit to identify event flags and capture of data for further analysis. These operations may allow for a vehicle assistance system to continually approach a desired data set of parameters while limiting and/or eliminating the need for manual review.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

FIGS. 1A-1B depict graphical representations of scenario data according to one or more embodiments. According to one embodiment, systems, configurations and processes described herein are directed to vehicle systems. FIGS. 1A-1B depict graphical representations of an exemplary scenario for a scene 100 associated with vehicle 105 and a plurality of objects. Scene 100 may relate to a particular location or period of time, wherein the presence of objects and/or one of more vehicle characteristics may allow for a sensor of vehicle 105 to detect one or more objects. According to one embodiment, vehicle 105 may include one or more sensors to detect objects based on vehicle trained data. By way of example, for objects present in scene 100, vehicle 105 is configured to interpret vehicle sensor data to detect one or more of the objects. In certain embodiments, vehicle sensor data may be related to one device or one type of device, such as an image sensor (e.g., camera). As such, one or more target objects may be identified by vehicle 105 using vehicle trained data from sensed image data. According to other embodiment, vehicle 105 may include a plurality of sensing devices generating multiple types of sensor output, including one or more of image, proximity sensing, radar, and LiDAR.

Vehicle 105 may be configured to detect and classify a plurality of object types and scenarios, such as braking event or lane shift, using trained vehicle data. Embodiments discussed herein allow for assessing when vehicle trained data sets do not sufficiently allow for detection or handling of target objects. By way of example, the vehicle 105 may detect an object, but not be able to identify or determine how to control vehicle 105 in response to the object. Other embodiments allow for assessing the vehicle familiarity with objects using a trained data set. In that fashion, while the embodiments may employ specific sensor types and/or target object attributes, the systems, processes and configuration discussed herein allow for detecting anomalies with one or more different sensor configurations or vehicle training data sets. Moreover, the principles of the disclosure can be applied to different sensor configurations of a vehicle.

FIG. 1A depicts an exemplary scene including objects which may be detected and identified by one or more units, such as a control unit of vehicle 105. In FIG. 1A, scene 100 includes vehicle 105 having one or more detection areas shown as 110 and 111, the detection areas generally referring to a forward direction of travel for detection area 110 and a backward facing direction for detection area 111 of the vehicle 105. Detection areas 110 and 111 are shown relative to one or more directions of vehicle 105 that may be assessed and or accounted for in the trained vehicle data set. According to one embodiment, one or more sensors of vehicle 105 can detect objects relative to the detection areas of the vehicle, including forward, back, and lateral direction areas of the vehicle. Scene 100 may relate to an exemplary scenario, or type of scene of interest to the vehicle. In addition, each scene detected by vehicle 105 may be associated with one or more of the type of object, number of objects, location of objects, movement of objects, etc. According to another embodiment, each scene may be associated with at least one of the operating characteristics of the vehicle, and operating characteristics of other vehicles. According to an exemplary embodiment, scene 100 includes pedestrian 120, lane markers 125 and 130, vehicle 135 and roadway boundary 140.

Vehicle 105 may not only identify a type of target object, such as pedestrian or passenger vehicle, but may also utilize one or more attributes of the object to characterize a target object. Attributes and object types may be stored in annotated baseline data or vehicle trained data that may be utilized by a control unit of vehicle 105 to identify objects and in some cases control vehicle 105. In an exemplary embodiment, vehicle 105 may detect lane markers 125 and 130 and one or more attributes associated with each target. By way of example, vehicle 105 may detect the location, spacing, color, angular diversion, and one or more additional attributes to detect a scenario that may be of interest to the vehicle. In some cases, such as highway driving, vehicle 105 may be trained to detect and handle lane markers 125 and 130 that appear in more or less a straight line for an extended period. Identification of these attributes may be used by an assistive system of vehicle 105 to stay within lane markers 125 and 130. As will be discussed herein, vector representation of sensed vehicle data for target objects, such as lane markers 125 and 130, can be used to identify scenarios where the trained vehicle data is not equipped to handle target objects, such as a sudden departure in positioning of lane markers 125 and 130, or a narrowing of roadway 140. In addition to event capture, configurations are directed to determining when and what type of vehicle sensor data is not adequately included in vehicle trained data. As such, configurations are provided for identifying at least one of a target object of interest, scenario of interest and range of data collected by a vehicle.

In yet another embodiment, configurations are provided to flag events for one or more of a target object and scenario of interest. According to one embodiment, vehicle 105 may be configured to communicate with communication network 115 for data exchange with one or more network resources, such as servers, to share target objects and scenarios. In certain embodiments network resources may be used to provide updates to vehicle trained data used by vehicle 105 in response to reported objects or scenarios.

Another embodiment is directed to determining how a run time algorithm, such as a scene detection operation, is familiar with data reported by vehicle 105. Vehicles configured for assisted or autonomous driving may record vast amounts of data. Reporting vehicle sensor data may not be necessary when the vehicle 105 can adequately handle the scenario or scene based on a trained vehicle data set. Referring to the highway driving example described above between lane markers 125 and 130 for long stretches (e.g., on the order of mile/km), reporting and later processing of the data and scenario may not be required. However, reporting anomalies or unexpected changes to a driving scenario can be useful to assess the trained vehicle data set. In certain situations, there is a need for configurations that determine how well the vehicle is detecting objects and flag scenarios where the vehicle operation or vehicle trained data set need updating.

Another embodiment includes identifying how well the driver assistance system handles target objects or scenarios that are unknown or not properly classified by a vehicle control unit. By way of example, vehicle 105 may detect several pedestrians, such as pedestrian 120, or several vehicles, such as vehicle 135, wherein attributes of the vehicle trained data set can account for differences in the actual objects while still classifying the objects to the correct object type and/or appropriate object attributes. FIG. 1A depicts a significant scenario 145 as a question mark, as vehicle sensor data may identify that scenario 145 is associated with a target object or vehicle condition that is not understood using the vehicle trained data set. For example, the trained data set may not understand a target object using the trained data set when one or more of the object, object attribute, and driving condition exceed a degree or threshold relative to a vector representation of the detected sensor data. Operations and configurations discussed herein provide for various unidentified scenarios. Embodiments are also directed to scoring operations using a generated vector for unidentified objects, such as scenario 145.

With respect to target objects, scenario 145 may relate to an unidentified object. Described another way, scenario 145 may relate to an object detected by vehicle 105 but unknown to the vehicle. By way of example, if scenario 145 relates to a person dressed in a chicken suit (or other costume for that matter), attributes of the vehicle trained data set used by vehicle 105 may not be able to identify the object, as the chicken suit would likely result in characteristics not including attributes for a pedestrian object type. Or possibly the chicken suit may be associated with object attributes for two different object types resulting in a conflict. Another object type example for scenario 145 may relate to detection of a rare object, such as a monster truck (e.g., vehicle with extremely large tires, and possibly pyrotechnics) that is detected by vehicle 105. Attributes of target object types for vehicles in a trained vehicle set will typically be directed to passenger vehicles, a detected monster truck may be a scenario of interest. Scenarios of interest may be characterized as being worth reporting by vehicle 105. Scenario 145 may relate to vehicle operating characteristics, such as abrupt maneuvering (e.g., sliding, loss of traction) or vehicle control (e.g., braking). During a typical rush hour drive a vehicle operator (or autonomous system) may heavily depress the brakes. In some situations, repeated braking in close proximity to other vehicles may be normal for a particular vehicle during a particular time of day and/or on a particular route/stretch of road. However, in other situations, abrupt or repeated braking or other vehicle operating conditions may be a scenario, such as scenario 145, worth reporting. By way of example, the vehicle trained data set for assistive braking or autonomous driving may not be trained to maintain a proper distance of separation. As such, systems, devices, and vehicle configurations are provided for identifying scenarios of interest relative to a trained vehicle data set. In addition, scoring may be performed to determine how familiar a train vehicle set can analyze scenario 145.

With respect to object types and scenarios, the principles of the disclosure may also apply to assessing the familiarity of a vehicles assistive driving unit as a whole, for various scenarios. Assistive driving systems trained on roadways in pleasant weather conditions may have difficulty when weather or other situations arise. Weather, the presence of snow or other precipitation and even loss of grip may be attributes accounted for assessing vehicle trained data sets.

FIG. 1B illustrates an exemplary segment of objects relative to a timeline. With respect to reporting, a control unit of a vehicle (e.g., vehicle 105) may be configured to report at least one of an object of significance and a segment of data captured by the vehicle. In some cases, reporting a target object may allow for the vehicle to better understand unfamiliar pedestrians, such as a man in a chicken suit. In other instances, reporting all target objects and attributes may be for a period of time preceding and following a target object. FIG. 1B shows scene data 150 relative to a timeline 155 and for a segment 160 of interest. Segment 160 may be identified relative to target objects and attributes identified when reporting. As will be discussed in more detail below, a segment of data, such as vehicle sensor data may be reported in response to a scene detection operation to identify a significant scenario or object. FIG. 1B is an exemplary representation of segment 160, where objects prior to the segment, such as vehicle 165, will be excluded from the reporting. In one embodiment, reporting a segment of object targets includes reporting objects priori to a significant scenario data, such as pedestrian 170 prior to, scenario 180, and objects following the scenario, such as vehicle 175. Embodiments herein allow for reporting simply scenario 180, and/or reporting segment 160 including objects 170 and 175 and scenario 180.

While FIGS. 1A-1B depict an exemplary scene and segment of objects/scenarios that may be detected, embodiments are provided herein for identification of significant data and scenarios.

Figure 2:
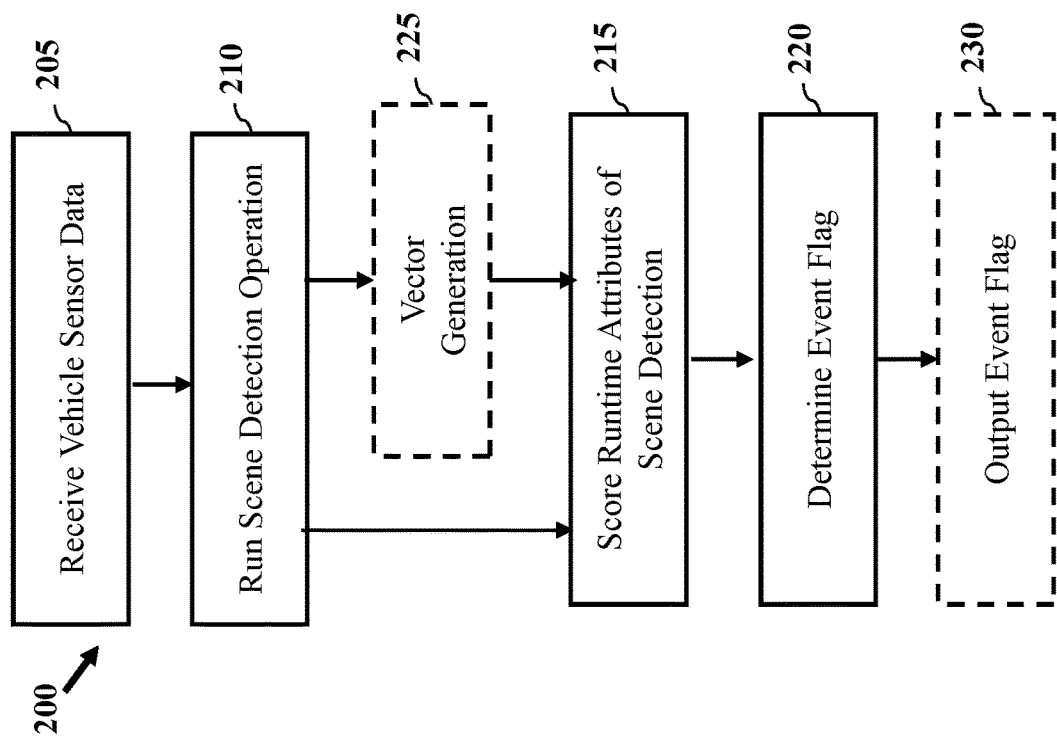
FIG. 2 depicts a process for control unit operation according to one or more embodiments.

FIG. 2 depicts a process for evaluating a trained vehicle data set of driver assistance system according to one or more embodiments. Process 200 may be performed by a control unit (e.g., control unit 305 of FIG. 3). According to one embodiment, process 200 includes receiving vehicle sensor data captured by at least one sensor of the vehicle at block 205, running a scene detection operation at block 210, and scoring runtime attributes of the scene detection at block 215. An event flag may be determined at block 220. Process 200 may be performed by a control unit, such as a navigation control unit, of a vehicle. The control unit may be configured to receive positioning data for the vehicle, such as global positioning data (e.g., GPS). The control unit may also store map data for one or more geographic regions associated with vehicle position. In certain embodiments, the control unit is configured to receive roadway information services such as traffic and weather associated with routes of the map data. Roadway and condition information such as weather may be included in one or more attributes of a trained vehicle data set.

According to one embodiment, process 200 may be based on a trained vehicle data set. By way of example, a trained vehicle data set may include an annotated training data set from an advanced driver assistance system (ADAS) or autonomous driving (AD) system with raw sensor data based on several attributes with ground truth. Vehicle sensors can include data for one or more of video, radar, and LiDAR as ground truth used for annotation. Ground truth data provides the system with a perceptible object types and attributes. Process 200 can allow for the extraction and use of a driver assistance system operating parameters (e.g., algorithm, processes, etc.) during runtime to assess familiarity with its own baseline data set to identify and flag for capture an anomaly. This capture would be used to update the training of the run time algorithm in a subsequent release by updating the baseline data set. Process 200 provides real-time recognition of a scenario familiarity based on an existing training set.

At block 205, vehicle sensor data captured by at least one sensor of the vehicle is received. The vehicle sensor data may be generated by a driver assistance system of a vehicle and may relate to at least one of image, radar, and LiDAR data for a detection zone of the driver assistance system of the vehicle. Vehicle sensor data can also characterize operation of a vehicle and one or more other vehicles relative to the vehicle to include data for driving distance relative to the vehicles, number of vehicles, vehicle type, etc.

At block 210, the control unit runs a scene detection operation on the vehicle sensor data using a trained vehicle data set to identify target object attributes of the vehicle sensor data. In one embodiment, running the scene detection operation on the vehicle sensor data generates an annotated data set for target objects in real time based on the attributes of the trained vehicle data set. By way of example, the scene detection operation not only identifies target objects, but also performs operations to perceive the objects using a trained vehicle data set. The trained vehicle data set can provide a plurality of object types and object attributes. The scene detection operation block 210 can generate a dataset characterizing a scene relative to a vehicle. According to one embodiment, the dataset can be approximated using clustering of the types of data based on the attributes.

At block 215, the control unit scores run time attributes of the scene detection operation against a vector representation for an annotated data set. Scoring may be performed to assess the ability of the scene detection operation to perceive target object attributes of the vehicle sensor data using the trained vehicle data set. Scoring evaluates effectiveness of the scene detection operation in identifying target object attributes of the vehicle sensor data. In one embodiment, scoring run time attributes of the scene detection operation includes determining a value to represent object types and object attributes not included in the vehicle trained data set.

In one embodiment, scoring run time attributes of the scene detection operation includes determining a measure of a known data set relative to instantaneous vehicle data during in a runtime environment, the scoring to include comparing handled events with detection anomalies. A vector representation or anomaly vector can describe the measurement from the centroids to the boundaries of each cluster in a data set. For every attribute added to the data set description, another boundary condition is added which can constrain the data collection. The vector may be provided from a network service to a vehicle control unit.

In one embodiment, process 200 may be employed to flag data of interest in order to collect data (e.g., smaller amounts of data, snippets) and upload to the cloud. Flagging data of interest provides efficiency in capturing data and/or reporting data.

In one embodiment, effectiveness of the scene detection operation is determined based on a probability or measure that the trained vehicle data set can handle target objects of the vehicle sensor data. Attributes may be different and data set will be different based on different vehicles and sending packages deployed to the vehicles. In the perception world, objects are classified into specific categories. Certain embodiments may include using a decision tree, where the boundary of the tree is limited. The neural network for the decision tree can provide ten classes, and give each class a number. For example, a vehicle may be assigned a percentage such as 50%; if 50% is the percentage or degree associated with the system qualifying that an object is a car. For each object, one anomaly score can isolate a single attribute.

At block 220, a control unit can determine an event flag for the trained vehicle data set based on the scoring. The event flag identifies a parameter for updating the trained vehicle data set. According to certain embodiments, process 200 may optionally include generating a vector representation at optional block 225. In certain embodiments, the vector representation, and associated data for an annotated baseline data set may be received or provided to a control unit. In one embodiment, vector representation for the annotated data set provides a spatial representation for a plurality of objects and object attributes of ground truth objects and wherein the vector representation for the annotated data set is used as a reference for comparing vehicle sensor data.

The control unit can generate a vector representation for the scene detection operation and the attributes of the vehicle sensor data. According to one embodiment, the vector representation includes one or more operations to generate a model, such as a vector space model representing objects in a continuous vector space where similar objects are mapped to nearby points. According to one embodiment, the number of attributes for objects in the trained vehicle set directly correlates to the number of dimensions of the generated vector. Generating the vector representation can include performing a clustering operation for target objects of the vehicle sensor data using the trained vehicle data set to generate a vector data model for the vehicle sensor data. For example, a clustering method such as K-means clustering may be used to approximate the "area" of a collected and annotated data set that is used to train a run time algorithm for scene detection. According to one embodiment, the vector representation is a representation of effectiveness of the scene detection operation in identifying target object attributes of the vehicle sensor data. The vector data model can characterize ability of the trained vehicle set to perceive target objects of the vehicle sensor data.

According to one embodiment, a trained vehicle data set is stored in a data repository, such as a cloud repository, and may be provided to one or more vehicles (e.g., control units). A resultant vector may be generated from clustering to describe the dataset for performing scene operations. In one embodiment, the vector is generated concurrently with the algorithm release for the run time system.

According to another embodiment, the vector is then used in the run time system to score the scenario based on the attributes of detected target objects. Process 200 may optionally include scoring a vector representation against objects detected in a scene at block 215. According to one embodiment, the control unit can score a vector representation on the ability of the scene detection operation to perceive target object attributes of the vehicle sensor data using the trained vehicle data set. A significant scenario may be identified data based on a score of the vector representation below a predetermined threshold. Event flags may be issued or generated in response to significant scenarios.

According to certain embodiments, process 200 may optionally include outputting an event flag at block 230. In one embodiment, the event flag is generated to identify a data range of the vehicle sensor data and target object. In one embodiment, the event flag represents a vehicle operation condition that is identified to be outside of the trained vehicle data set.

In certain embodiments, segments of data output may include data for target objects detected for a period preceding and following identification of a significant event. Reporting the event flag and segments of scenario data is an improvement over systems that report all data, especially when a vehicle is operated for an extended period of time.

According to an exemplary embodiment, process 200 may include determining an event flag in response to significant scenario data identified. Operations may be based on a vector representation of a trained data set and vehicle sensor data from one or more sensors (e.g., sensors $335_{1-n}$, of FIG. 3). Receiving vehicle sensor data at block 205 can include receiving data from vehicle sensors including but not limited to an image sensor (e.g., video), radar sensor, LiDAR sensor, acceleration/motion sensor and vehicle sensors (e.g., wheel speed sensor, tire pressure monitoring system (TPMS) sensor, ABS sensor, yaw/pitch sensor, stability control sensor, etc.). Sensor data may be received by a control unit by way of a controller area network (CAN) bus of the vehicle. Sensor data received at block 205 may be used to run a scene detection operation at block 210.

In one embodiment, the scene detection operation at block 210 identifies received sensor data and a vector representation may be generated for sensors individually and/or in combination. In certain embodiments, a scene detection operation may be performed to identify sensor data that is outside of a normal or trained operating range. For vehicle handling, for example, one or more of throttle sensor output, braking controls (e.g., ABS braking system sensors), tire pressure, etc., may be detected for a period of time. When one or more of the sensors have a change in output associated with an event sensor data preceding, during and after the event may be captured. A significant scenario may be detected when one or more sensor outputs exceed or differ from a trained data set. By way of example, for a vehicle traveling on at high speeds during highway driving, the scene detection operation may include trained data for a particular vehicle speed with braking, tire pressure and other sensor data to be in a relative range. When sensor data indicates a departure from expected bounds for the scenario, such as vehicle a being controlled or operated at speeds too high for exiting the highway as indicated by one or more of elevated tire pressure, increased breaking, vehicle sensor data may indicate a significant scenario where trained data does not provide acceptable operation of the vehicle. Because highway exits often differ, trained data for a vehicle may benefit from scenes and scenarios captured by the vehicle.

According to another embodiment, sensor data detected at block 205 may result in a significant scenario when the sensor does not provide an accurate representation. By way of example, one or more sensors of the vehicle may be configured for certain operating parameters, such as a cameras definition based on the number of pixels or frames detected. For certain driving scenarios, such as low speed driving, the camera resolution and frame rate may be acceptable for driving at low speeds, while higher speed operations may require increase resolution or rates of detection. Accordingly, a significant scenario may be detected may relate to an indication of the sensors ability to provide data in addition one or more training parameters for the vehicle control unit. An event flag may be determined at block 220 in response to the identification runtime attributes having a score below a predetermined threshold. By way of example, sensor data not identifying an object with a degree of certainty over 50% may result in an event flag. In certain embodiments, an event flag may be generated when a particular type of object is not identified with a runtime score above a predetermined value. In on embodiment, failure to classify an attribute of an object with a score above 75%, for example, such as the type of vehicle may result in an event flag. In certain embodiments, the event flag may be determined when the average of a plurality of objects or driving conditions falls below a predetermined threshold. Outputting an event flag at block 230 can include providing sensor data in addition to the indication of the event. For camera devices, outputting scenario at block 230 can include transmitting image data captured and objects identified by the vehicle control unit as part of the scene detection operation.

According to one embodiment, when the scenario relates to a pattern of detected data, event flags may relate to a trained data set not recognizing or handling departures in patterns or pattern types that are not trained. According to one embodiment, vehicle sensor data at block 205 relates to a pattern, such as roadway markers, or road width. Patterns may also relate to objects relative to a road, such as barriers or bicyclists. The scene detection operation at block 210 may detect the pattern from sensor data and a vector representation of the sensor data may be employed to characterize operation of the vehicle relative to the pattern. Runtime attributes of the scene may be scored at block 215 to determine the ability of the training data set to perceive the scene. An event flag may be determined at block 220 when the trained data set does handle the pattern change. By way of example, roadway markers for a period of time, such as 100 yards (e.g., 300 m) that suddenly change or result in a lane shift. Similar examples include the presence of lane barriers and then a shift in position. A trained data set that is not configured to recognize the sudden changes or departures from the pattern may result in an event flag. Another example could be the sudden appearance of a lane barrier. With respect to movable or moving objects a significant scenario may be operating characteristics of another vehicle that appears to be swerving. Another example of the significant scenario may be the pattern of a motorcycle or bicyclist traveling in a pattern/expected trajectory that sudden shifts toward a vehicle of the control unit. In such an instance, one or more vehicle systems such as a stability control modules may generate a scenario that is not recognized and/or not trained.

FIG. 3 depicts a graphical representation of a vehicle control unit according to one or more embodiments. According to one embodiment, a vehicle includes a control unit 305 which may be configured to interface with one or more vehicle components. According to one embodiment, control unit 305 may be configured to perform one or more processes and functions described herein, such as process 200 of FIG. 2. Control unit 305 may relate to a control unit of a vehicle navigation unit, advanced driver assistance system (ADAS) or autonomous driving (AD) system.

In an exemplary embodiment, control unit 305 includes one or more elements or modules for interfacing with vehicle components. FIG. 3 shows control unit 305 including a control module 306, scene detection module 307 and vector generation module 308. Control unit 305 may receive position data for a vehicle from receiver 310. One or more executable instructions and navigation data (e.g., map data) may be stored by data storage 320. Input output module 320 may be configured to interface one or more other devices including but not limited to network resources. Control unit 305 may be configured to communicate with a vehicle system 330, including an engine control unit (ECU).

According to one embodiment, control module 306 represents one or more functional and hardware elements of control unit 305 that may be configured to direct operation of the control unit. Control module 306 may be configured to receive and utilize a trained vehicle data set. Control module 306 may direct one or more communications to vehicle system 330, which may include output to one or more of a vehicle bus and electronic control unit configured to control vehicle operation (e.g., braking, lighted indicators, safety features, etc.).

According to one embodiment, scene detection module 307 represents one or more functional and hardware elements of control unit 305 that may be configured to analyze target objects and vehicle operations. Scene detection module 307 may identify one or more significant events.

According to one embodiment, vector generation module 308 represents one or more functional and hardware elements of control unit 305 that may be configured to generate a vector and one or more anomalies against the vector. Vector generation module 308 may estimate the familiarity of a trained vehicle set with a current driving scene or environment. Sensor module 308 may also receive one or more control signals for a sensor that is part of vehicle system 330 relating to the status of a filter.

According to one embodiment, the principles, processes and device configurations may be applied to one or more sensor packages. FIG. 3 is shown including sensors $335_{1-n}$, configured to provide data to vehicle system 330. According to one embodiment, sensors $335_{1-n}$, may relate to one or more sensors of a vehicle associated with control unit 305. Sensors $335_{1-n}$, may provide output to a CAN bus of vehicle system 330 which may also be received by control unit 305 by way of a CAN bus or other vehicle system.

Sensors of the vehicle can include one or more of an image sensor (e.g., video), radar sensor, LiDAR sensor, acceleration/motion sensor and vehicle sensors (e.g., wheel speed sensor, tire pressure monitoring system (TPMS) sensor, ABS sensor, yaw/pitch sensor, stability control sensor, etc.), throttle sensor, and vehicle sensor in general. Output of sensors $335_{1-n}$, may be provided as vehicle sensor data to control unit 305 for processing.

According to one embodiment, sensors $335_{1-n}$ may relate to one or more vehicle acceleration sensors and/or vehicle stability control sensors (e.g., traction control). Sensors $335_{1-n}$ may include a plurality of acceleration sensors (e.g., accelerometer) and sensors for yaw, pitch and steering angle. In certain embodiments, identifying a significant event may be related to the ability of a vehicle trained data set to control vehicle operation relative to a roadway or curve. As such, scoring may generate an objective value representing the ability of a traction control system of the vehicle to handle a roadway. For example, sensors $335_{1-n}$ may generate output indicating understeer or oversteer from one or more of sensors $335_{1-n}$. Sensors $335_{1-n}$, may include a vehicle accelerometer (e.g., single axis, multi-axis) and one or more yaw/pitch sensors to track vehicle displacement through a curve. In situations where the trained data set is used to operate the vehicle and/or employed by the traction control system, a significant event may be determined for understeer and/or oversteer.

Figure 4:
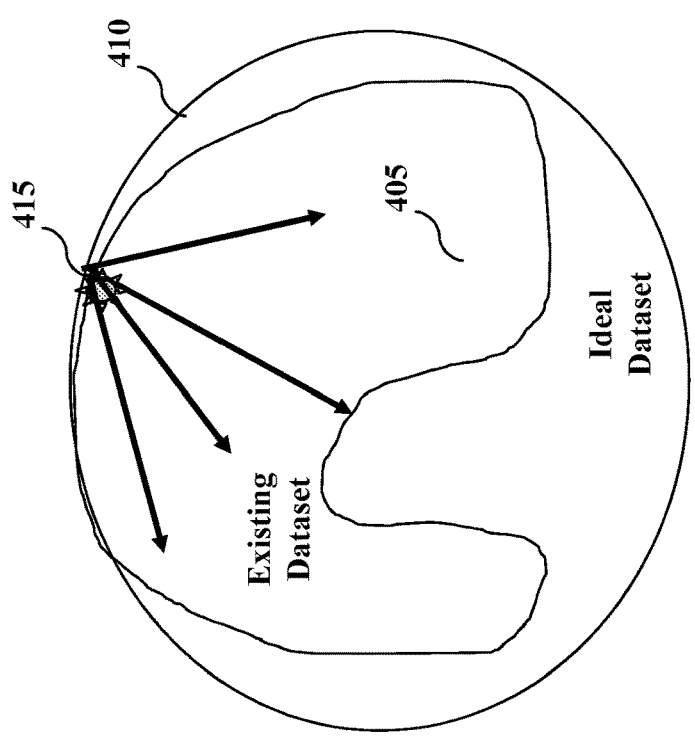
FIG. 4 depicts a graphical representation of a trained vehicle data set according to one or more embodiments.

FIG. 4 depicts a graphical representation of a trained vehicle data set according to one or more embodiments. According to one embodiment, a trained vehicle data set is a known training data set used to train algorithms that operate autonomous vehicles and assisted driving systems of various types. FIG. 4 provides an exemplary illustration of a trained vehicle data set relative to an ideal data set.

According to one embodiment, an ideal data set can be reached where most or all driving scenes are adequately handled. The ideal data set for a vehicle may depend on the sensors of the vehicle, sensing ability, sensor data, etc. Even with improved sensors, there is a need to assess the ability of a system to detect and handle objects and scenarios. In addition, there is a need to identify situations a vehicle training data set does not adequately address.

FIG. 4 illustrates a representation of a known or existing data set 405 relative to an ideal data set 410. Existing data set 405 may relate to a known data set including a known training data set used to train algorithms that operate autonomous vehicles of various types. Processes and operations discussed herein may generate a familiarity metric or vector, shown as vectors 415, using data captured by one or more local vehicle sensors or combined sensors, and subsequent real-time algorithms measuring scene statistics. In one embodiment, the familiarity of data set 405 is generated based on many possible attributes captured by the host vehicle and associated algorithms. According to one embodiment, exemplary attributes can include, but are not limited to: number of target objects, classification of target objects, size and shape of target objects, number of lanes, lane type, lane marker color, lane marker shape or dash type, vehicle state behavior such as sliding, vehicle location, environmental conditions that effect visibility of target objects and lanes. These attributes may be employed to describe the dimensions of a vector, or vectors 415, generated by a neural network that uses a technique of clustering known attributes of a known training data set. One or more of vectors, such as vector 415 may be used in a run time environment to detect anomalies against the vector. The described vector is the estimate of the run time algorithm's familiarity with the environment in which it is used. To describe the general use of the aforementioned vector, the vector is generated as part of a software release for an autonomous vehicle control system that describes the entire training set of data. In one embodiment, the vector is scored continually during run time in the autonomous vehicle control system as part of the perception engine. This scoring provides the method to identify significant or unfamiliar scenario data and flag or record associated data in a previously unmentioned data recorder.

Ideal data set 410 may represent a set of data that may not be achieved. Systems and configurations discussed herein may operate based on data set 405 that is known. An anomaly detection vector may be generated for data set 405 to describe the data set. Processes discussed herein provide a trigger mechanism that triggers an event or scenario that has not been presented in the data set 410.

Figure 5:
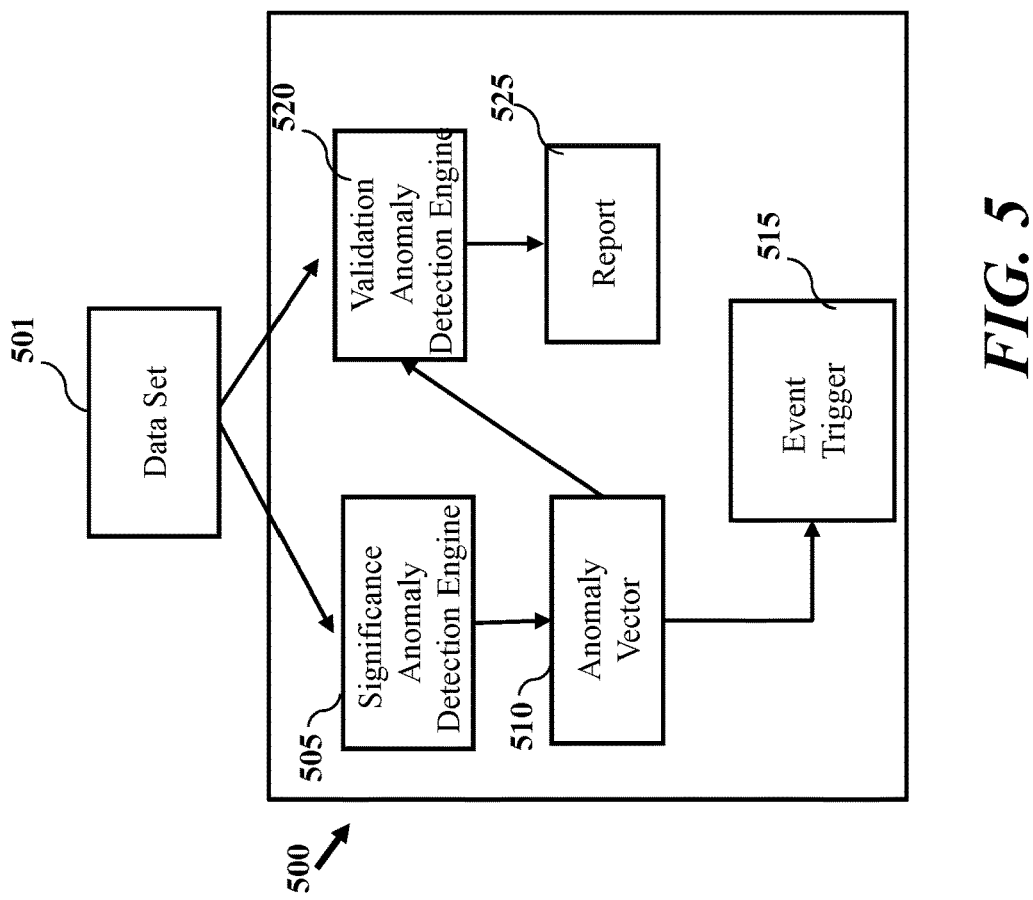
FIG. 5 depicts a graphical representation of control unit operations according to one or more embodiments.

FIG. 5 depicts a graphical representation of control unit operations according to one or more embodiments. Control unit operations can facilitate the automatic identification of new data that an existing assistive vehicle algorithm would be unfamiliar with. According to one embodiment, a vehicle control unit 500 may perform functions for at least one of significance anomaly detection and validation anomaly detection. Vehicle control unit 500 may be configured to receive a trained vehicle data set 501 from a data repository, such as a cloud repository. The vehicle data set may be provided to a vehicle to perform scene detection and/or other operations.

In one embodiment, vehicle control unit 500 includes a significance anomaly detection engine module 505 configured to perform a clustering method, such as K-means clustering, to approximate the "area" of the collected and annotated data set that is used to train the run time algorithm. A resultant vector, from anomaly vector block 510, is generated from clustering and is used to describe the dataset. The vector may be generated concurrently with the algorithm release for the run time system. In one embodiment, the vector is then used in a run time system to score the scenario based on one or more attributes. An anomaly that escapes the clustering described by the anomaly vector would trigger a flag at event trigger block 515 in a data collection system that describes an event. According to one embodiment, this event is significant to the existing data set 501 since the trained run time algorithm is not familiar with the scenario According to one embodiment, significance anomaly detection engine module 505 may be trained to detect anomalies of a baseline or existing data set. For example, the baseline data set may be used to train an algorithm to look for its overall significance for greater understanding of environment. In a situation where straight flat road with two lanes is captured, more data will result in comparison to a specific corner with a particular situation, such as a pedestrian in chicken suit. The person in the chicken suit would be an anomaly based on base line data set user.

According to another embodiment, a common pattern, such as a set route from home to office, may be determined for a set period of time. If one day a vehicle is driven to another location, that is a route or path anomaly. In certain embodiments, new routes can be an anomaly. To detect anomalies, vehicle sensors may be employed to determine object attributes, such as measuring GPS distance to objects, objects in the view, rate of distance, and objects with their own pattern.

According to one embodiment, significance anomaly detection engine module 505 can find the thresholds of the pattern. The vector may be uploaded or downloaded to a car. A cars event trigger will watch the thresholds to identify events. Event flags may result from the GPS location deviating from the normal pattern. In one embodiment, a picture of a scene may be taken and uploaded to the cloud. On the cloud service, the machine will determine if there is a hard situation.

According to one embodiment, compiled events captured during the capture period are added to the resultant data set and cycled through the training process for the next algorithm release. The new data set is then approximated again to update the clustering of objects.

At block 520, validation anomaly detection engine receives the anomaly vector from block 510. According to one embodiment, the anomaly vector may be used by validation anomaly detection engine module 520 to assess the familiarity of data set 501 within instantaneous analysis of a scene. Validation anomaly detection engine module 520 can detect anomalies against the anomaly vector from block 510 and generate a report on the familiarity of the data set 501 with a scene, scenario, or vehicle sensor data.

In one embodiment, an event flag may be generated when vehicle sensors conflict. Sensor confliction may be one method for triggering an event (initially say camera radar conflicts with drive driver being one of the sensors). The driver inputs into the steering wheel over compensate that triggers even, capture previous thirty seconds, and loads that into a flag. Data may be collected provided to a cloud server to validate a scene as being valid or invalid scene.

Figure 6:
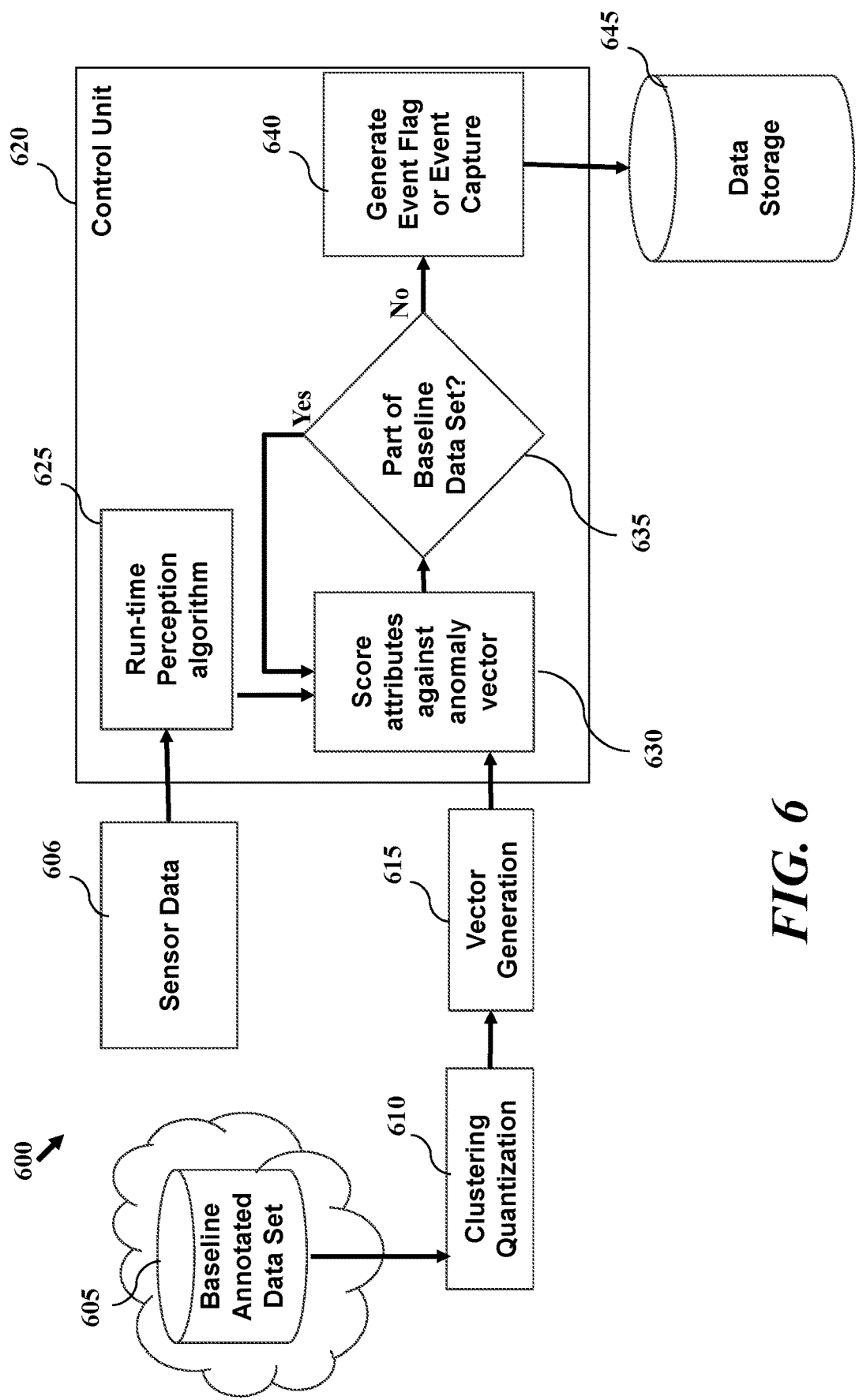
FIG. 6 depicts a graphical representation of operations relative to a known data set according to one or more embodiments.

FIG. 6 depicts a graphical representation of operations relative to a known data set according to one or more embodiments. Process 600 describes operations for a vehicle system according to one or more embodiments. In one embodiment, process 600 is directed to performing operations for significance anomaly detection. According to another embodiment, process 600 is directed to validation of an anomaly detection engine. Process 600 may relate to one or more control unit operations of a significance anomaly detection engine module and a validation anomaly detection engine module (e.g., significance anomaly detection engine module 505 and validation anomaly detection engine module 520 of FIG. 5).

According to one embodiment, baseline data set 605 including a plurality of object types and object attributes may be employed as a known training data to train algorithms of a vehicle assistance system, such as a scene detection operation. A clustering quantization operation is performed at block 610 for the baseline data set and a vector generation operation is performed at block 615 based on characteristics of the data clusters generated at block 610. The clustering quantization may include one or more operations to classify and annotate objects by type and attributes. As a result of clustering, objects having similar attributes may form clusters that may be analyzed by vector based modeling. Given a known data set, such as baseline data set 605, including a known training data set used to train algorithms that operate autonomous vehicles of various types, process 600 is configured to generate a familiarity metric or vector at block 615. One or more vectors may be generated describing the centroid of each cluster from block 610 and result in a representation that may be employed by a vehicle control unit to analyzed sensed data and/or the baseline data set 605. Operations at block 610 and 615 may be performed to describe the baseline annotated data set 605, such as whether or not the baseline data set includes data similar or capable of describing sensed vehicle data. The vector generated at block 615 may be used to identify object targets or vehicle operating conditions of significance. According to another embodiment, blocks 610 and 615 may be embodied as computer executable code that may be deployed to a vehicle for use in a driver assistance system. According to one embodiment, attributes are used to describe the dimensions of a vector generated at block 620 by a neural network using clustering of the known attributes at block 610 the training data set 605.

According to another embodiment, operations for anomaly detection may be provided by process 600. Using data captured by a local vehicle sensor or combined sensors at block 606 and subsequent real-time algorithms measuring scene statistics such as a perception algorithm at block 625 familiarity of the baseline data set may be determined. Process 600 includes scoring attributes against an anomaly vector at block 630. Scoring may provide one or more values, such as a percentage or value within a range identifying characterizing familiarity of the baseline annotated data set 605 with objects detected at block 625. Scoring may be based on many possible attributes captured by the host vehicle provided in sensor data 606 and associated algorithms performed at block 625. Exemplary attributes in one embodiment can include, but are not limited to: number of target objects, classification of target objects, size and shape of target objects, number of lanes, lane type, lane marker color, lane marker shape or dash type, vehicle state behavior such as sliding, vehicle location, environmental conditions that effect visibility of target objects and lanes. Scoring at block 630 can allow for identification of significant or unfamiliar scenario data to be flagged or record associated data in a data recorder or storage unit of a vehicle.

According to one embodiment, scoring at block 630 is performed based on a predetermined amount of variability. According to one embodiment, for objects detected optically, an acceptable amount of variability may be allowed for certain object classifications. Accordingly, scoring based on a first object class may employ a first amount of variability, while scoring a second object type may employ a second amount of variability, the second amount of variability different from the first. Thus, camera sensor data from block 606 identifying a pedestrian object may have a low threshold for determining significance, relative to signage which is usually associated with a limited set of pre-established set of objects and thus, have a higher threshold for significance. With respect to scoring sensor attributes, scoring may asses the divergence of sensor output relative to trained sensor ranges. In certain embodiments, scoring at block 630 is configured to assess a trained data sets ability to perceive a driving scenario based on sensor data 606. By way of example, a trained data set may provide a basis for one or more of presenting an indication, controlling a vehicle unit or activating a vehicle control system (e.g., active breaking, throttle control, etc.) based on sensor data 606 and vector generation 616. Scoring at block 630 can provide an indication of the trained data sets ability to handle sensed data. In one embodiment, scoring at block 630 can result in at least one of a percentage and/or value measurement of accuracy for the trained data set relative to sensor data 606. In certain embodiments, the determined score may be output with generated flags in order for updating a trained data set.

According to one embodiment, operations performed by control unit 620 employ a vector generated at block 615 in a run time environment to detect anomalies against the vector. The described vector is the estimate of the run time algorithm's familiarity with the environment in which it is used. To describe the general use of the aforementioned vector, the vector is generated as part of a software release for an autonomous vehicle control system that describes the entire training set of data. The vector is scored continually during run time in the autonomous vehicle control system as part of the perception engine.

At decision block 635, process 600 determines whether target objects that are detected are part of a baseline data set, such as baseline annotated data set 605. When objects are included in the dataset, scoring at block 630 can reflect the data sets familiarity with sensed target object. When the target objects are not part of the base line data set, an event flag to identify a target object or an event capture to detect a segment of target objects may be generated at block 640. Process 600 may include outputting event flags and event capture of block 640 to a data storage unit 645 or network resource (e.g., server, cloud network) which may be used to annotate and/or update a baseline annotated data set 605. Event flags and event captures in data storage 645 may also be used to identify one or more of objects, object attributes and scenarios that are unique.

Figure 7A:
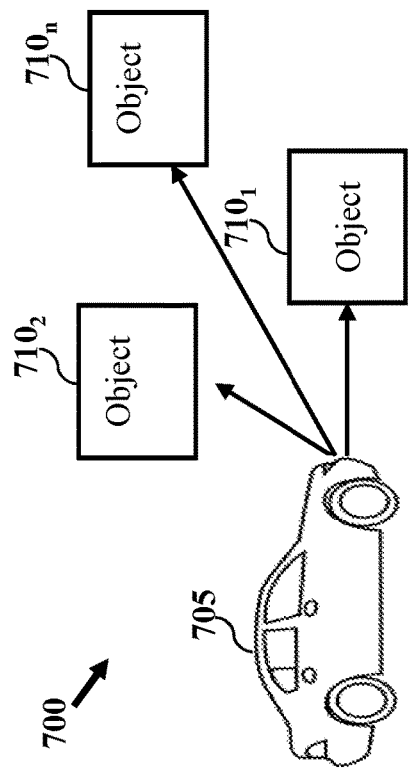
FIGS. 7A-7B depict graphical representations of determining event flags according to one or more embodiments.
Figure 7B:
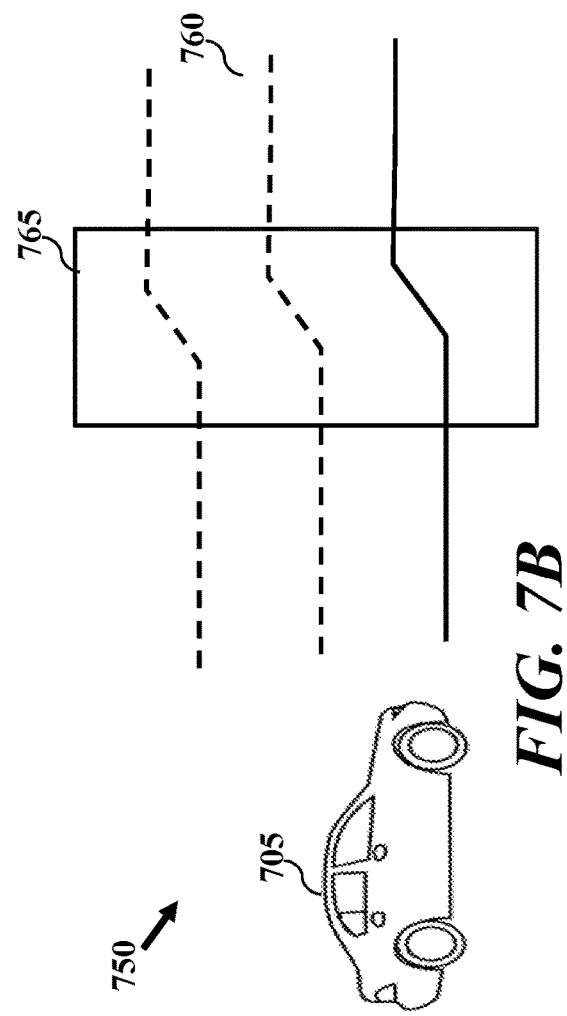

FIGS. 7A-7B depict graphical representations of determining event flags according to one or more embodiments. Referring first to FIG. 7A, scene 700 includes vehicle 705 and objects $710_{1-n}$. According to one embodiment, a control unit of vehicle 705 may be configured to determine how familiar run time operations, such as a scene operation, and the vehicle trained data set are for objects $710_{1-n}$. Attributes familiarity can include operations of objects $710_{1-n}$ themselves, and operations of vehicle 705. By way of example, a trained vehicle data set may include attributes to identify types of objects $710_{1-n}$, such as all being vehicles, the vehicle type and following distances. During a period of time that vehicle is operated within scene 700, one or more sensors of vehicle 705 may capture data. By using a vector representation of the trained data set and vehicle sensor data, data may be identified for one or more portions of the period of time the vehicle is operated in scene 700. In one embodiment, vehicle 705 may generate and/or output an event flag for operation of vehicle 705 that is identified to be outside of the trained vehicle data set.

According to one embodiment, an event flag may be generated for the scenario in FIG. 7A based on objects $710_{1-n}$, and the trained data set. According to one embodiment, when one a plurality of objects, such as $710_1$ may not be recognized using the trained data set. Alternatively, the scoring for object $710_1$ based on a trained data set may result in a score or value below a predetermined threshold. The event flag may result in vehicle 705 generating an event flag and reporting at least one of time of detection and object attributes of object $710_1$. The event flag may also provide sensor data associated with object $710_1$ for a period associated with the event flag, including data prior to determination of the event flag and data following the determination of the event flag.

Referring to FIG. 7B, scene 750 includes vehicle 705 and object 760. According to one embodiment, a control unit of vehicle 705 may be configured to determine how a familiar run time operation, such as a scene operation, and the vehicle trained data set are for object 760. Object 760 relate to lane markers that abruptly shift. According to one embodiment, a vehicle may detect the lane shift, but the trained data set may not efficiently or proper handle the lane shift. A vehicle control unit may determine that a segment of detected data, the segment shown as 765, may be used to update and annotated baseline data set.

According to one embodiment, an event flag may be generated for the scenario in FIG. 7B in response to the scoring of a trained data set with respect to handling a change in a pattern such as the lane shift of segment 765. According to one embodiment, the trained data set may not be configured to handle or respond to the pattern change of detected lane markers, such as segment 765 using the trained data set. Alternatively, the scoring for segment 765 based on a trained data set may result in a score or value below a predetermined threshold. An event flag may be generated and reported for segment 765 and may include the period prior to the segment and the period following the segment of object 760. According another embodiment, the event flag will not include reporting of the entire segment of object 760. In that fashion, the segment of interest and the trained data set scoring may be reported in an event flag.

While this disclosure has been particularly shown and described with references to exemplary embodiments thereof, it will be understood by those skilled in the art that various changes in form and details may be made therein without departing from the scope of the claimed embodiments.

What is claimed is:

1. A method for evaluating a trained vehicle data set of a driver assistance system, the method comprising:
   receiving, by a control unit, vehicle sensor data captured by at least one sensor of a vehicle, the vehicle sensor data generated by a driver assistance system of the vehicle;
   running, by the control unit, a scene detection operation on the vehicle sensor data using a trained vehicle data set to identify target object attributes of the vehicle sensor data;
   scoring, by the control unit, run time attributes of the scene detection operation against a vector representation for an annotated data set to assess an ability of the scene detection operation to perceive the target object attributes of the vehicle sensor data using the trained vehicle data set, wherein scoring evaluates effectiveness of the scene detection operation in identifying the target object attributes of the vehicle sensor data;
   determining, by the control unit, an event flag for the trained vehicle data set based on the scoring, whether the event flag identifies at least one of a parameter and data sample for updating the trained vehicle data set; and
   responsive to determining the event flag, transmitting, by the control unit, a segment of the vehicle sensor data to one of a data storage unit and a remote server, the segment of the vehicle sensor data selected based on the event flag.

2. The method of claim 1, wherein the vehicle sensor data includes at least one of image, radar, and LiDAR data for a detection zone of the driver assistance system of the vehicle.

3. The method of claim 1, wherein running the scene detection operation on the vehicle sensor data identifies target objects in real time based on attributes of the trained vehicle data set, the trained vehicle data set providing a plurality of object types and object attributes.

4. The method of claim 1, wherein the trained vehicle data set includes object types and object attributes for a known annotated data set.

5. The method of claim 1, wherein the vector representation for the annotated data set provides a spatial representation for a plurality of objects and object attributes of ground truth objects and wherein the vector representation for the annotated data set is used as a reference for comparing the vehicle sensor data.

6. The method of claim 1, wherein scoring run time attributes of the scene detection operation includes determining a value to represent object types and object attributes not included and underrepresented in the trained vehicle data set.

7. The method of claim 1, wherein scoring run time attributes of the scene detection operation includes determining a measure of a known data set relative to instantaneous vehicle data during in a runtime environment, the scoring to include comparing handled events and anomalies detected.

8. The method of claim 1, wherein an effectiveness score for the scene detection operation is determined based on a probability that the trained vehicle data set can handle target objects of the vehicle sensor data.

9. The method of claim 8, wherein the segment of the vehicle sensor data is a subset of the vehicle sensor data for which the effectiveness score for the scene detection operation is below a threshold effectiveness score for the scene detection operation.

10. The method of claim 1, further comprising:
receiving an updated annotated data set from the remote server based on the segment of the vehicle sensor data.

11. A vehicle control unit comprising:
an input configured to receive vehicle sensor data from at least one sensor of a vehicle; and
a control unit coupled to the input, wherein the control unit includes instructions stored in a data storage unit that, when executed, cause the control unit to:
receive the vehicle sensor data captured by the at least one sensor of the vehicle, the vehicle sensor data generated by a driver assistance system of the vehicle;
run a scene detection operation on the vehicle sensor data using a trained vehicle data set to identify target object attributes of the vehicle sensor data;
score run time attributes of the scene detection operation against a vector representation for an annotated data set to assess an ability of the scene detection operation to perceive the target object attributes of the vehicle sensor data using the trained vehicle data set, wherein scoring evaluates effectiveness of the scene detection operation in identifying the target object attributes of the vehicle sensor data;
determine an event flag for the trained vehicle data set based on the scoring, whether the event flag identifies a parameter for updating the trained vehicle data set; and
responsive to determining the event flag, transmit a segment of the vehicle sensor data to one of the data storage unit and a remote server, the segment of the vehicle sensor data selected based on the event flag.

12. The vehicle control unit of claim 11, wherein the vehicle sensor data includes at least one of image, radar, and LiDAR data for a detection zone of the driver assistance system of the vehicle.

13. The vehicle control unit of claim 11, wherein running the scene detection operation on the vehicle sensor data identifies target objects in real time based on attributes of the trained vehicle data set, the trained vehicle data set providing a plurality of object types and object attributes.

14. The vehicle control unit of claim 11, wherein the trained vehicle data set includes object types and object attributes for a known annotated data set.

15. The vehicle control unit of claim 11, wherein the vector representation for the annotated data set provides a spatial representation for a plurality of objects and object attributes of ground truth objects and wherein the vector representation for the annotated data set is used as a reference for comparing the vehicle sensor data.

16. The vehicle control unit of claim 11, wherein scoring run time attributes of the scene detection operation includes determining a value to represent object types and object attributes not included and underrepresented in the trained vehicle data set.

17. The vehicle control unit of claim 11, wherein scoring run time attributes of the scene detection operation includes determining a measure of a known data set relative to instantaneous vehicle data during in a runtime environment, the scoring to include comparing handled events and anomalies detected.

18. The vehicle control unit of claim 11, wherein an effectiveness score for the scene detection operation is determined based on a probability that the trained vehicle data set can handle target objects of the vehicle sensor data.

19. The vehicle control unit of claim 18, wherein the segment of the vehicle sensor data is a subset of the vehicle sensor data for which the effectiveness score for the scene detection operation is below a threshold effectiveness score for the scene detection operation.

20. The vehicle control unit of claim 11, wherein the control unit includes further instructions stored in the data storage unit that, when executed, cause the control unit to:
receive an updated annotated data set from the remote server based on the segment of the vehicle sensor data.

* * * * *

UNITED STATES PATENT AND TRADEMARK OFFICE
CERTIFICATE OF CORRECTION

PATENT NO. : 10,839,263 B2
APPLICATION NO. : 16/156366
DATED : November 17, 2020
INVENTOR(S) : Aaron Thompson et al.

Page 1 of 1

It is certified that error appears in the above-identified patent and that said Letters Patent is hereby corrected as shown below:

On the Title Page

Column 1, item (54) and in the Specification, at Column 1, Lines 1-4 correct:
"SYSTEM AND METHOD FOR EVALUATING A TRAINED VEHICLE DATA SET FAMILIARITY OF A DRIVER ASSITANCE SYSTEM"
To read:
"SYSTEM AND METHOD FOR EVALUATING A TRAINED VEHICLE DATA SET FAMILIARITY OF A DRIVER ASSISTANCE SYSTEM"

Signed and Sealed this
Nineteenth Day of January, 2021

Andrei Iancu
*Director of the United States Patent and Trademark Office*